(12) United States Patent
Formanski et al.

(10) Patent No.: US 6,939,631 B2
(45) Date of Patent: Sep. 6, 2005

(54) FUEL CELL SYSTEM AND METHOD OF OPERATION

(75) Inventors: Volker Formanski, Wiesbaden (DE); Martin Woehr, Pittsford, NY (US); Thomas Herbig, Darmstadt (DE)

(73) Assignee: General Motors Corporation, Detroit, MI (US)

( * ) Notice: Subject to any disclaimer, the term of this patent is extended or adjusted under 35 U.S.C. 154(b) by 390 days.

(21) Appl. No.: 10/251,638

(22) Filed: Sep. 20, 2002

(65) Prior Publication Data

US 2003/0072980 A1 Apr. 17, 2003

(30) Foreign Application Priority Data

Sep. 24, 2001 (DE) .......................................... 101 46 943

(51) Int. Cl.[7] .............................................. H01M 8/04
(52) U.S. Cl. ............................ 429/13; 429/22; 429/24; 429/25
(58) Field of Search ............................ 429/13, 22, 23, 429/24, 25, 26

(56) References Cited

U.S. PATENT DOCUMENTS

| | | | |
|---|---|---|---|
| 5,432,020 A | 7/1995 | Fleck ............................ 429/13 |
| 5,434,016 A | * 7/1995 | Benz et al. .................... 429/13 |
| 5,780,981 A | 7/1998 | Sonntag et al. ............. 318/139 |
| 6,383,670 B1 | * 5/2002 | Edlund et al. ................. 429/20 |
| 6,818,336 B2 | * 11/2004 | Isom et al. .................... 429/22 |
| 2001/0009731 A1 | 7/2001 | Ruoff et al. | |
| 2002/0039672 A1 | * 4/2002 | Aramaki ....................... 429/22 |
| 2003/0186096 A1 | * 10/2003 | Keskula et al. ............... 429/25 |
| 2003/0203257 A1 | * 10/2003 | Keskula et al. ............... 429/25 |

FOREIGN PATENT DOCUMENTS

| | | | |
|---|---|---|---|
| DE | 19540824 A1 | 5/1997 | ............ H01M/8/04 |
| DE | 10021946 A1 | 7/2001 | ............ H01M/8/02 |
| DE | 10002006 A1 | 8/2001 | ............ H01M/8/06 |
| EP | 0629013 A2 | 5/1994 | ............ H01M/8/04 |
| JP | 08-045525 | 2/1996 | |
| JP | 200315509 | 11/2000 | |
| JP | 2002-313388 | 10/2002 | |

OTHER PUBLICATIONS

German Search Report dated Aug. 9, 2002.
"Apparatus for Furnishing a reaction mixture for a reforming catalyst of a fuel cell assembly, and method for its operation".

* cited by examiner

Primary Examiner—Stephen J. Kalafut
(74) Attorney, Agent, or Firm—Cary W. Brooks

(57) ABSTRACT

The present invention provides a method of operating a fuel cell system and a fuel cell system that can adjust the operating pressure of the fuel cell system to maximize efficiency. This present invention recognizes that under certain operating conditions appropriately matched operating pressures enable a substantially more efficient system operation. The method of the present invention and the fuel cell system of the present invention incorporate the recognition that a higher system efficiency can be achieved when the operating pressure produced by the air compressor is matched to the prevailing operating temperature of the fuel cell system.

59 Claims, 12 Drawing Sheets

FUEL CELL SYSTEM AND METHOD OF OPERATION

BACKGROUND

The present invention relates to fuel cell systems and more particularly to a fuel cell system with increased efficiency and method of operating the fuel cell system.

Fuel cell systems, for example PEM fuel cells connected together to form a fuel cell stack which serve for the generation of electrical energy, for example electrical drive energy for a motor vehicle are known in the art. The fuel cell stacks include an anode inlet for a fuel, such as hydrogen and a cathode inlet for oxygen, for example in the form of atmospheric oxygen. The oxygen is delivered by a compressor driven by an electric motor which is operated with the electrical energy generated. A cooling system is provided for carrying away heat generated in the fuel cell stack and in doing so determines the respective operating temperature of the fuel cell stack.

Current fuel cell systems operate at fixedly pre-set design values for the operating temperature and operating pressure of the system. The operating pressure is typically pre-set within very tight limits. Although the present invention is not limited to structure or steps that satisfy any specific needs, it is noted that the present inventors have recognized a need in the art for a method of operating a fuel cell system with operating parameters that are not pre-set design values so that the fuel cell system may operate in a more efficient manner. There is also a need in the art for a fuel cell system capable adjusting the values of the operating parameters so that the fuel cell system may operate in a more efficient manner.

SUMMARY OF THE INVENTION

The present invention provides an improved fuel cell system and method of operation.

In one embodiment of the present invention, a method for operation of a fuel cell system is provided. The fuel cell stack defines a plurality of operating points. Each of the operating points are characterized by an operating temperature and an operating pressure. A cooling system that establishes an actual operating temperature of the fuel cell stack is also provided. At least one actual operating temperature of the fuel cell stack is determined. A compressed flow of an oxygen containing gas is provided to a cathode inlet at the operating pressure. The operating pressure is controlled such that it represents a minimum pressure necessary to ensure operation of the fuel cell system at an actual operating point defined by said actual operating temperature.

In accordance with another embodiment of the present invention, a fuel cell system is provided comprising a fuel cell stack, a cooling system, a temperature sensor, and pressure components. The fuel cell stack defines a plurality of operating points wherein each of the operating points are characterized by an operating temperature and an operating pressure. The cooling system is adapted to establish an actual operating temperature of the fuel cell stack. The temperature sensor is adapted to determine the actual operating temperature established by the cooling system. The pressure components are configured to produce a compressed flow of oxygen containing gas for delivery to a cathode inlet of the fuel cell stack at the operating pressure. The operating pressure represents a minimum pressure necessary to ensure operation of the fuel cell system at an actual operating point defined by the actual operating temperature.

The various embodiments of the present invention will be more fully understood from the following description of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

DETAILED DESCRIPTION

Figure 1:
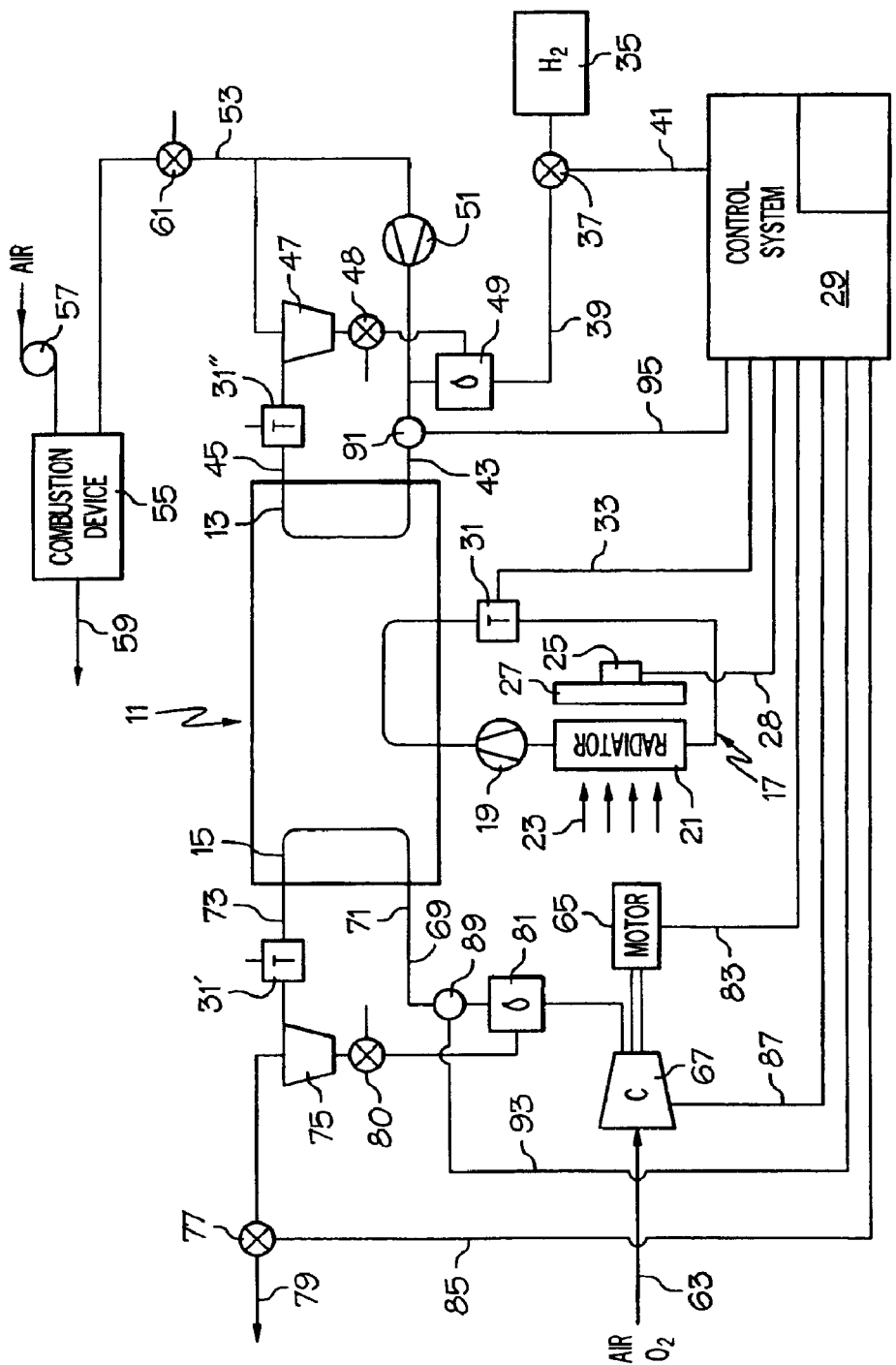
FIG. 1 is a block circuit diagram of a fuel cell system in accordance with the invention.

Referring to FIG. 1 a basic layout of a fuel cell system with the associated components is shown, in practice many different variants are possible. A schematic representation of a fuel cell stack 11 integrated into a fuel cell system and consisting of a plurality of individual fuel cells which are connected electrically in series and/or in parallel is shown. The anode sides of all individual fuel cells of the stack 11 are connected together in a manner known per se with the resulting anode side of the stack being designated with the reference numeral 13. In similar manner the cathode sides of all fuel cells of the stack are connected together in a manner known per se and the cathode side of the fuel cell stack is designated in FIG. 1 by the reference numeral 15.

The loop 17 in FIG. 1 signifies a liquid cooling system which is incorporated into the stack 11 and is likewise known per se. This cooling loop is completely separate from the anode side 13 and the cathode side 15 and represents a closed cooling loop with a pump 19 and radiator 21. The radiator 21 is preferably so arranged on installation in a motor vehicle that air flows through it as indicated by the arrows 23 in order to cool down the liquid coolant. The flow through the radiator 21 is assisted by a fan 27, which can be driven by an electric motor 25. The speed of the electric motor 25 can be controlled via a line 28 from a control system 29, i.e. the cooling power can be influenced by the control system 29.

A temperature sensor 31 is connected via the line 33 to the control system 29. The operating temperature of the fuel cell stack 11 can not only be measured by means of the temperature sensor 31 at the coolant outlet but also, or alternatively, by means of temperature sensors 31', 31" at the cathode outlet and/or the anode outlet of the fuel cell stack 11. The temperature sensors being used are connected to the control system 29 via a corresponding line.

At the anode side 13 of the fuel cell stack 11, hydrogen $H_2$ is fed from a supply 35 via a restrictor valve 37 which can be switched via a line 39 into the anode circuit 13. The valve 37 is likewise connected to the control system 29 for regulation of the quantity of hydrogen supplied by electrical control of the valve 37 via the line 41. The hydrogen thus enters at the inlet 43 into the fuel cell stack 11 and the anode exhaust gases, which contain non-consumed hydrogen and water, emerge from the fuel cell stack at 45. The water is collected in a collecting container 47. Collected water can optionally be supplied via a valve 48 to a humidifier 49 for the $H_2$-flow and/or continuously or discontinuously discharged. A part of the emerging hydrogen is in this example returned to the inlet 43 again by means of the pump 51. A recirculation of this kind is however not necessary. A residual quantity of the exhaust gases at the anode side is supplied via the line 53 to a combustion device 55 together with the air from a fan 57 and burned to form water which leaves the stack via the line 59. The combustion device 55 does not have to be continuously in operation and can be insulated from the anode circuit 13 by means of a restrictor and/or outlet valve 61 which can be switched off.

At the cathode side 15 of the fuel cell stack 11, air which is sucked in via a line 63 is compressed by a compressor 67 driven by a motor 65 and is supplied via the line 69 to the cathode inlet 71 of the fuel cell stack 11. The cathode exhaust gases, which principally consist of water, nitrogen and a residual proportion of oxygen, emerge from the cathode outlet 73 of the fuel cell stack 11. The water contained in the cathode exhaust gases in the form of liquid is for example collected in the container 75 and the remaining exhaust gases including water in gaseous form are supplied to the environment via the restrictor valve 77 and the line 79. The water collected in the container 75 can either be discharged via a valve 80 or supplied to a humidifier 81 for the air flow.

The motor 65 is connected via the line 83 to the control system 29. By controlling the motor 65 via the line 83, the control system 29 can influence the speed of rotation of the air compressor 67 and thus the air mass flow delivered by it.

The valve 77, may be formed as a restrictor valve and connected to the control system 29 via the line 85. The valve 77 makes it possible, depending on its degree of opening, to set the operating pressure independently of the air mass flow. In addition, an air compressor 67 may be provided with components of variable geometry, such as adjustable guide vanes or guide nozzles being electrically controllable and adjustable from the control system 29 via the line 87. The variable geometry components may be controlled with the aid of a positioning motor.

All valves such as 61 and 80 may be connected via corresponding lines (only indicated by short lines) to the control system 29 and this also applies for other controllable components such as the coolant pump 19, the burner 55, the recirculation pump 51.

Humidity sensors 89, 91 are provided at the cathode side and at the anode side respectively and are connected via respective lines 93 and 95 to the control system 29 in order to be able to measure the relative humidity at the cathode inlet and at the anode inlet of the fuel cell stack 11.

Figure 2:
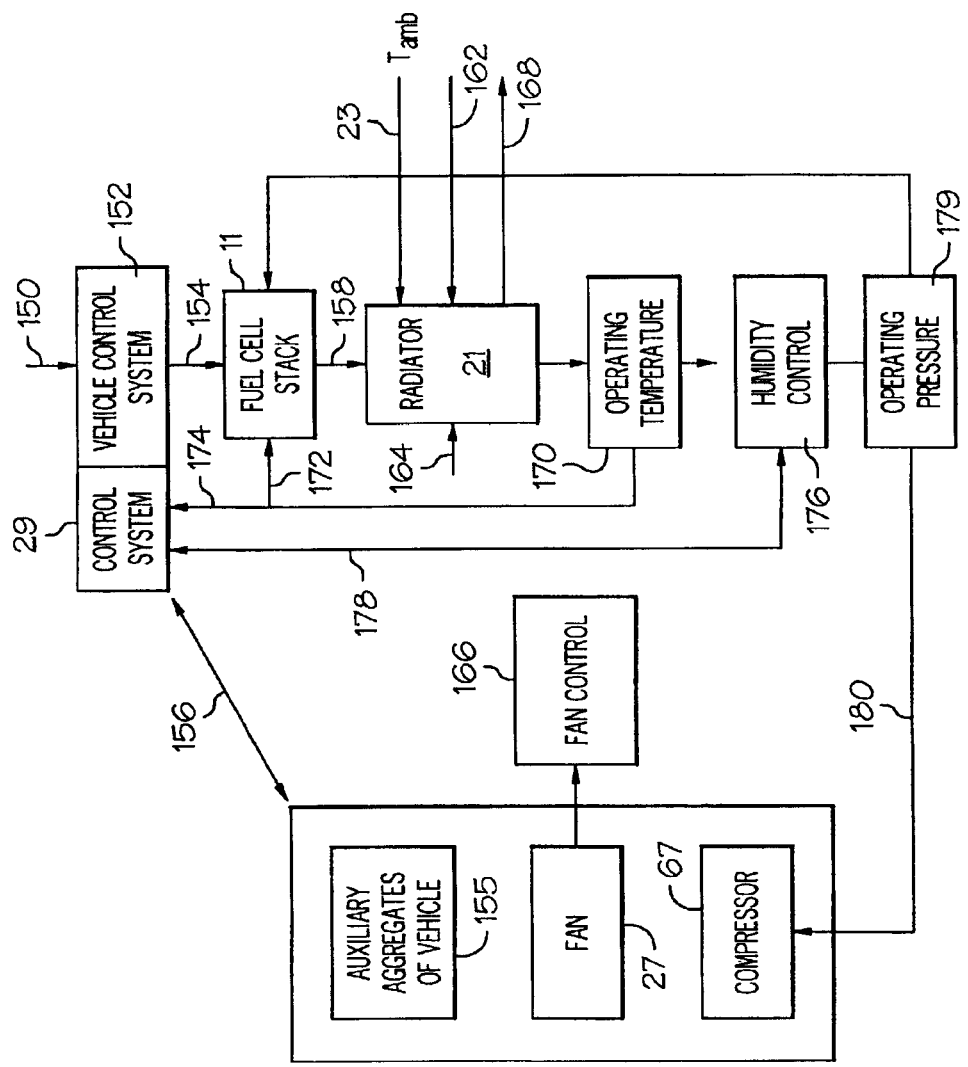
FIG. 2 is a block circuit diagram in order to explain in more detail the manner of operation of the method of the invention for the operation of a fuel cell system.

Referring to FIG. 2, a manner of operation of a fuel cell system in accordance with the present invention is shown. Arrow 150 indicates the power required by the driver of a motor vehicle containing the fuel cell system. By way of example, the driver can press on a gas pedal as in an customary vehicle and the degree of movement of the gas pedal or the pressure exerted by the driver on the gas pedal can be used to produce a power demand signal which is supplied to the vehicle control system 152. The control system 29 and/or vehicle control 152, which may be realized as a computer, serve to control the electrical motors which are responsible for the propulsion of the vehicle. The control system 29 also serves to control the fuel cell stack 11, as indicated by the arrow 154, in such a way that the power demanded by the driver is available.

To ensure that power is available, the hydrogen mass flow which is supplied to the anode side 13 of the fuel cell stack 11 is first controlled by the valve 37 of FIG. 1 in order to produce the required electrical power. Since this power is dependent on the drive power for the air compressor 67, the fan 27 associated with the radiator 21, and the pump 19, as well as on the power requirement for other auxiliary aggregates of the vehicle, such as for example the lighting system (here indicated with the reference numeral 155), the control system 29 receives corresponding signals which are schematically indicated here with the arrow 156 and which must be taken into account in the calculation of the system load by the control system 29.

The heat given off by the fuel cell stack, which is indicated by the arrow 158, is introduced into the radiator 21 and a heat exchange with environmental air having a specific ambient temperature $T_{amb}$ takes place. The cooling performance is dependent on the vehicle speed, which is indicated by the arrow 162. The flow of air through the radiator 21 is also dependent on the fan 27, with this dependency being indicated by the arrow 164. A fan control 166 is schematically indicated between the fan 27 and the radiator 21 and can be incorporated into the control system 29. The fan control 166 serves in principle to switch off the fan 27 or reduce the speed of the fan 27 at low vehicle speeds and when the vehicle is stationary, i.e. when the cooling requirement is low, in order to avoid unnecessary noise generation.

The result of the action of the ambient air on the radiator 21, which is influenced by the vehicle speed and the air flow of the fan 27, is the transfer of heat to the environment which is indicated by the arrow 168. The liquid which is cooled down in the radiator 21 then determines the operating temperature of the fuel cell stack 11. This operating temperature, which is schematically illustrated by the box 170 is preferably determined at the coolant outlet of the fuel cell stack 11 by the temperature sensor 33 of FIG. 1, or by the temperature sensors 31' or 31". The operating temperature has an effect on the operating point of the fuel cell stack 11, which is indicated by the arrow 172 and it is in other respects communicated to the control system 29 in accordance with the arrow 174 which symbolizes the communication via the line 33 of FIG. 1.

The box 176 points to a control for the characteristic humidity number $F_K$ which is shown here separate from the control system 29. The control of box 176 can, however, straightforwardly be a component of the control system 29 and is in any event coupled with the latter, as is symbolized by the double arrow 178. The task of this control 176 for the relative humidity is to determine the respectively desired operating pressure from curves as shown in FIG. 10 taking account of the relative humidity of the environmental air measured by the sensors 89 and 91 (FIG. 1) and the respective settings of the operating parameters preset by the control system 29 which determine the relative humidity at the total stack outlet, i.e. the stoichiometry at the anode and at the cathode and also the effects of existing humidifying devices 49, 81 and of returned humidity (for example through the recirculation pump 51).

Figure 10:
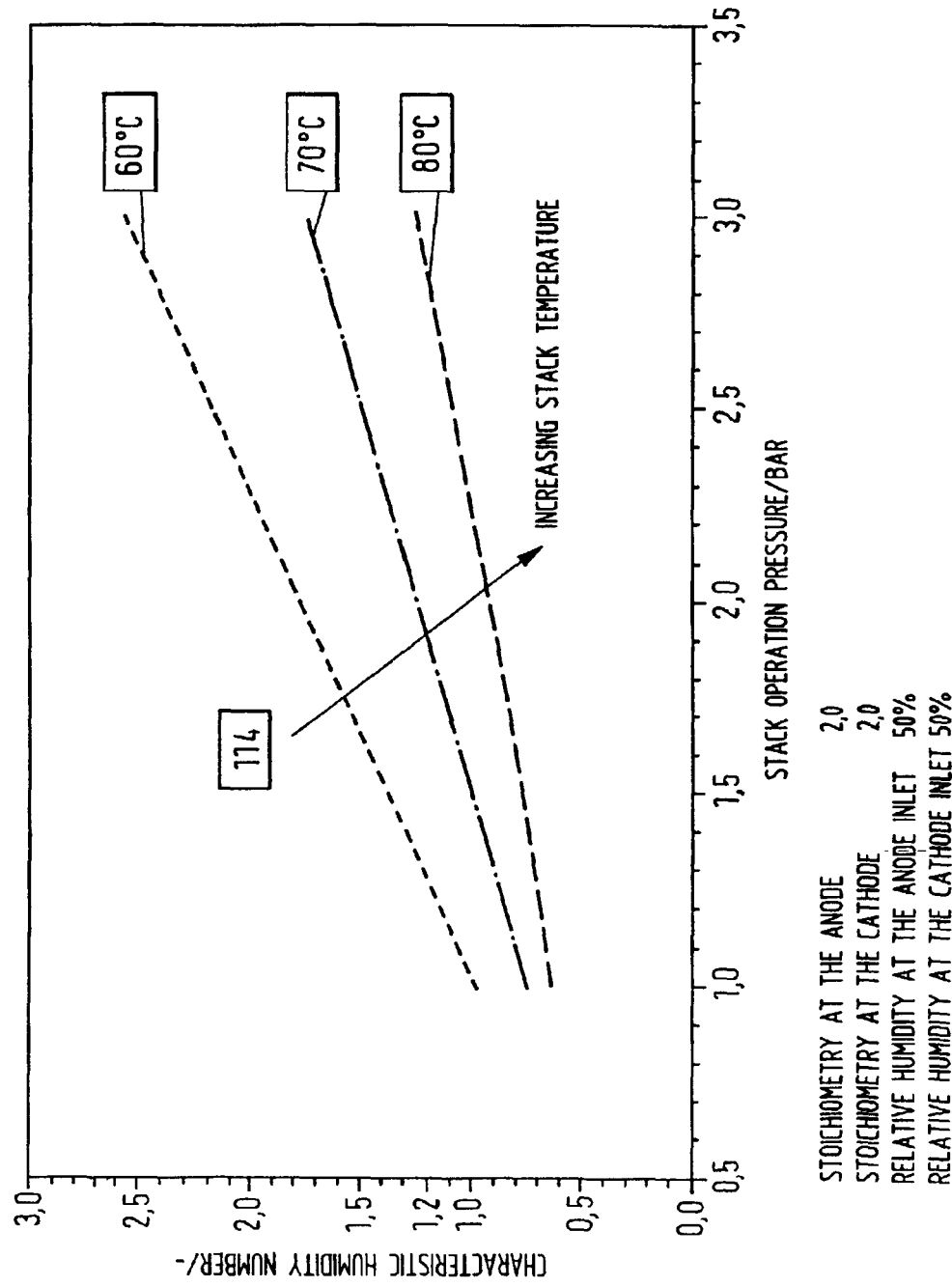
FIG. 10 is a graphical illustration of the humidity balance of a fuel cell in dependence on the operating parameters pressure and temperature with a line entered for the determination of the respectively appropriate operating pressure at a desired $F_K$ value.

The control system 29 may determine the respectively desired operating pressure from curves as shown in FIG. 10 (described in detail below). If an operating temperature of 70° C. is for example measured then the control 176 sets an operating pressure in accordance with FIG. 10 of about 1.9 bar, in order to obtain the desired characteristic humidity number $F_K$ of for example 120%. The operating pressure is symbolized by the box 179. The setting of the operating pressure is determined by the signals which are transmitted in FIG. 1 via the lines 83 and 85 and which determine the settings for the motor 65 for the air compressor 67 and for the valve 77 respectively. If required, it can be necessary, depending on the specific technical realization, to control also the air compressor via the line 87 in order to achieve the most efficient operation of the compressor 67 possible. These possibilities of control are symbolized in FIG. 2 by the arrow 180.

This present invention recognizes that under certain operating conditions appropriately matched operating pressures enable a substantially more efficient system operation. The method of the present invention and the fuel cell system of the present invention incorporate the recognition that a higher system efficiency can be achieved when the operating pressure produced by the air compressor is matched to the prevailing operating temperature of the fuel cell system. In this manner the control system 29 can always determine the ideal operating point of the fuel cell system and carry out all settings necessary to reach this operating point.

Various considerations concerning the layout of a fuel cell system in accordance with the invention will now be discussed. A fuel cell system serves in known manner to produce electrical power. A main component of the fuel cell system is the fuel cell stack 11 which is supplied at the anode side 13 with fuel (from the $H_2$-supply 35). In addition to the fuel gas supply, the fuel cell system also includes the air supply at the cathode side 15 which has a suitable air compressor 67 as the main component. The air compressor 67 supplies the fuel cell stack 11 with the required air mass flow at the required gas pressure. The air compressor 67 is as a rule electrically driven by the motor 65 and thereby consumes electrical power which is ultimately delivered by the fuel cell stack 11. The required compressor power is determined essentially by the air mass flow and by the pressure ratio of the compression in addition to the efficiency of the compressor action. Accordingly, a fuel cell system with an efficient air compressor 67 should be operated at the smallest possible air mass flow at that the smallest possible pressure level in order to keep the internal consumption of electric power in the fuel cell system as small as possible and thus to achieve a high efficiency of the whole system.

As stated above, in accordance with the invention, it is possible to achieve the air mass flow required for operation of the fuel cell stack at a desired power, for different operating pressures. The required air mass flow is achieved by taking account of the prevailing operating temperature and other parameters which can be specified, such as the relative humidity at the cathode outlet of the fuel cell stack. The electrical power required to achieve a desired air mass flow at higher operating pressures lies significantly higher than the electrical power which is required if the same air mass flow is achieved at a lower operating pressure. Since the electrical energy which is required for the operation of air compressor has a significant effect on the available power of the fuel cell system, a higher system efficiency can be achieved on the whole by reducing the operating pressure of the system.

In order to be able to achieve the desired air mass flow at various operating pressures, the air compressor, or the drive motor associated with the air compressor, and a regulatable restrictor valve at the cathode outlet of the fuel cell stack are designed and controllable in order to be able to change the operating pressure independently of the air mass flow. It can also be of advantage to provide the air compressor with variable geometry, for example adjustable guide vanes or guide nozzles in order to optimize the efficiency of the compressor.

When it is stated that the air compressor or a component associated with the air compressor is controlled in accordance with the operating temperature, or with a value corresponding or proportional thereto, then the statement is to be understood with respect to the operating temperature in such a way that one defines a reference temperature which can be used as the operating temperature. For example, one can take the temperature of the coolant at the coolant outlet of the fuel cell stack or the gas outlet temperature at the cathode outlet and/or at the anode outlet as the reference temperature. The invention is not restricted to liquid cooling, but could also be used if air cooling of the fuel cell stack is provided. Here the air cooling will also result in a specific operating temperature of the fuel cell stack.

The requirements of PEM fuel cells with respect to gas conditioning at the cathode side and at the anode side are different depending on the design and construction of the individual fuel cells and are as a rule complex. The main parameters which must be defined for a stable operation of a PEM fuel cell are the gas stoichiometry, the gas humidity, the gas pressure and the stack operating temperature.

It is important to take account of a reference value for the humidity of the fuel cell stack. By way of example this reference value can be the degree of saturation at the cathode outlet.

As a reference value for the humidity, a characteristic humidity number $F_K$ can for example be formed which is determined by the following equation:

$$F_K = \frac{(\dot{N}_{H_2O}^{Fl} + \dot{N}_{H_2O}^{Gas})_{C-out}}{\sum \dot{N}_{iC-out}} \cdot \frac{P_{C-out}}{P_{Ts}^*}$$

where $$\dot{N}_{H_2O}^{Fl}$$

is the mass flow of water in the form of liquid at the cathode outlet (C-out), $$\dot{N}_{H_2O}^{Gas}$$

is the mass flow of water in gaseous form at the cathode outlet (C-out), $$\sum^1 \dot{N}_{iC-out} = \dot{N}_{H_2O}^{Fl} + \dot{N}_{H_2O}^{Gas} + \dot{N}_{N_2} + \dot{N}_{O_2}, \text{ with } \dot{N}_{H_2O}^{Fl} + \dot{N}_{H_2O}^{Gas}$$

having the above-named meanings, $N_{N_2}$ is the mass flow of $N_2$ at the cathode outlet (C-out),
$N_{O_2}$ is the mass flow of $O_2$ at the cathode outlet (C-out),
$P_{C-out}$ is the partial pressure of the water at the cathode outlet and
$P^*_{Ts}$ is the saturation partial pressure of water at the respective operating temperature of the stack (the same as the prevailing temperature at the cathode outlet).

One could also consider a reference value which also incorporates the existing humidity at the anode side. This is in principle only to be recommended if water leaves the anode side with the anode exhaust gases.

The reference value for the humidity of the fuel cell stack should namely be kept within certain limits in order to ensure damage-free operation of the fuel cells, for example 120% +/–10%, and it is not necessary to provide higher values. There is however a unique correlation between the respectively prevailing operating pressure, the reference value for the relative humidity, and the operating temperature.

It is possible to specify a specific value for the reference value for the relative humidity, such as for example 120%, and to take account, during the selection of the respective operating pressure, of the family of curves which reproduce the relationships between the respectively prevailing operating pressures and the characteristic humidity numbers. In doing so, account must be taken of the fact that these curves are not only temperature dependent but rather also take account of the stoichiometry at the anode and at the cathode and of the relative humidity at the anode inlet and the relative humidity at the cathode inlet.

The stoichiometry at the anode, i.e. the ratio between the quantity of hydrogen supplied to the anode side and the quantity of hydrogen consumed there frequently lies, as a result of the design of the respective fuel cell stack, or type of fuel cell stack, at a substantially constant value of for example about 2.0. This does not however signify that the mass flow of the hydrogen supply remains constant, but rather this mass flow is changed by the system control in accordance with the respective power requirement. Should the stoichiometry at the anode not lie at a constant value as a result of a specific design of the fuel cell stack then the variation in the stoichiometry must be taken into account.

The stoichiometry at the cathode, i.e. the ratio of the quantity of oxygen supplied to the cathode to the quantity of oxygen which is consumed there can for example also lie at 2.0. This does not however signify that the mass flow of the oxygen which is supplied remains constant but rather this mass flow is changed by the system control in accordance with the respective power requirement. Should the stoichiometry at the cathode not lie at a constant value, as a result of a specific design of the fuel cell stack, then the variation of the stoichiometry must be taken into account.

The relative humidity at the cathode inlet, which influences the respective magnitude of the characteristic humidity number and which is the determining factor for the selection of the respective family of curves for the regulation of the prevailing operating pressure in order to achieve the desired characteristic humidity number $F_K$, varies depending relative on the humidity of the environmental air sucked in by the air compressor. It can, however, also be influenced by humidifying devices which are sometimes provided in order to ensure an adequate relative humidity at the cathode side and/or at the anode side of the fuel cell stack.

The relationships between the reference value for the humidity $F_K$, the operating pressure, the operating temperature and the relative humidity at the cathode inlet and at the anode inlet are unambiguous. Accordingly, they always permit the ideal operating pressure which is suitable for operation at the respective operating temperature of the fuel cell stack to be selected and to hereby allow the fuel cell stack to the operated in the most efficient manner, for example through maps stored in a data memory.

Through the gas stoichiometry, the required gas mass flow at which the fuel cell is to be operated is predetermined depending on the load case. The concentration distribution of the reactants within the stack is also set by the gas stoichiometry. When using the respectively selected fuel cell membranes and the respective fuel cell design, the gas humidity must observe certain limiting values in order to have an adequate working life of the membranes and also a good conductivity of the membranes.

Figure 3:
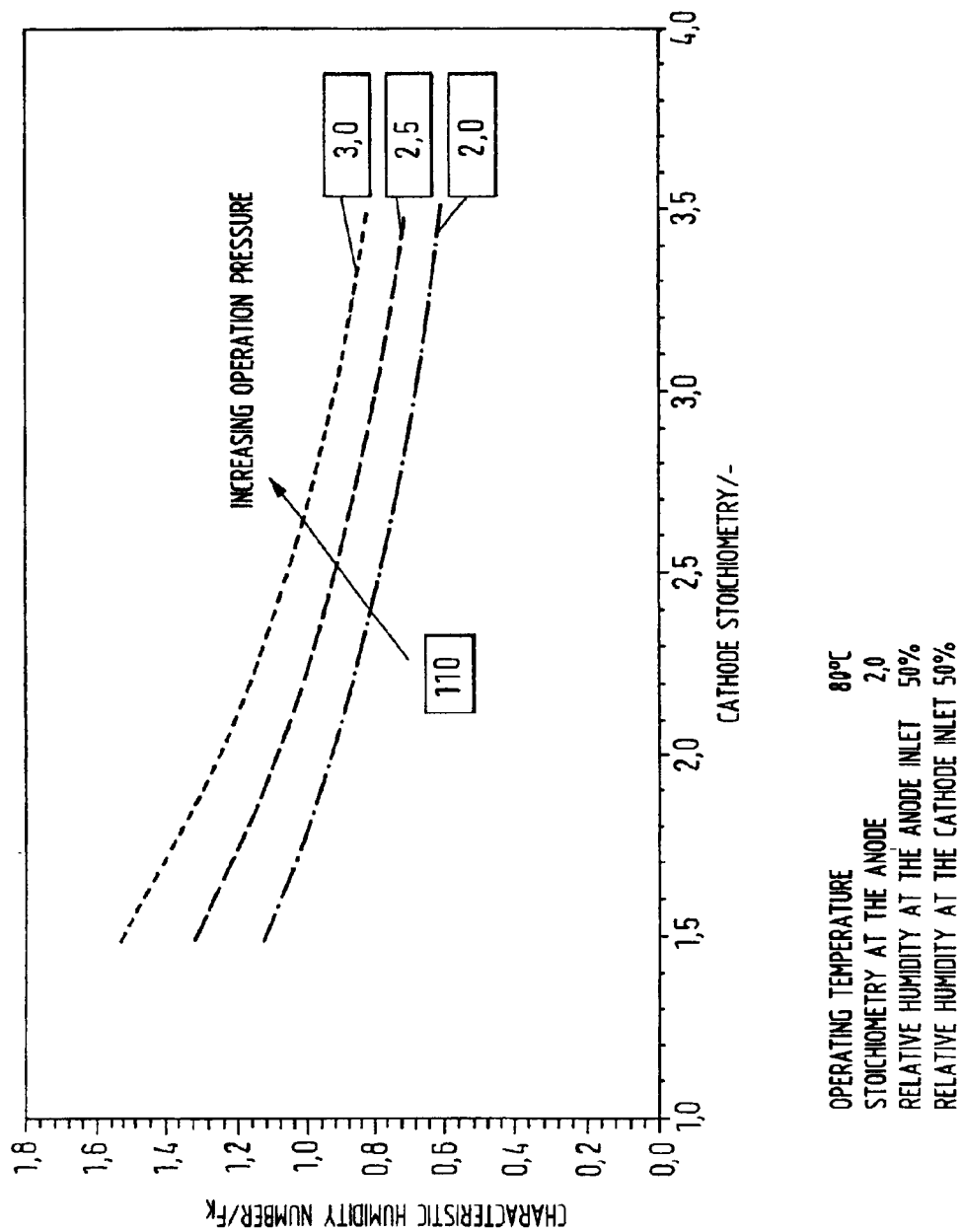
FIG. 3 is a graphical illustration of the humidity balance of a fuel cell in dependence on the operating parameters pressure and stoichiometry at the cathode.
Figure 4:
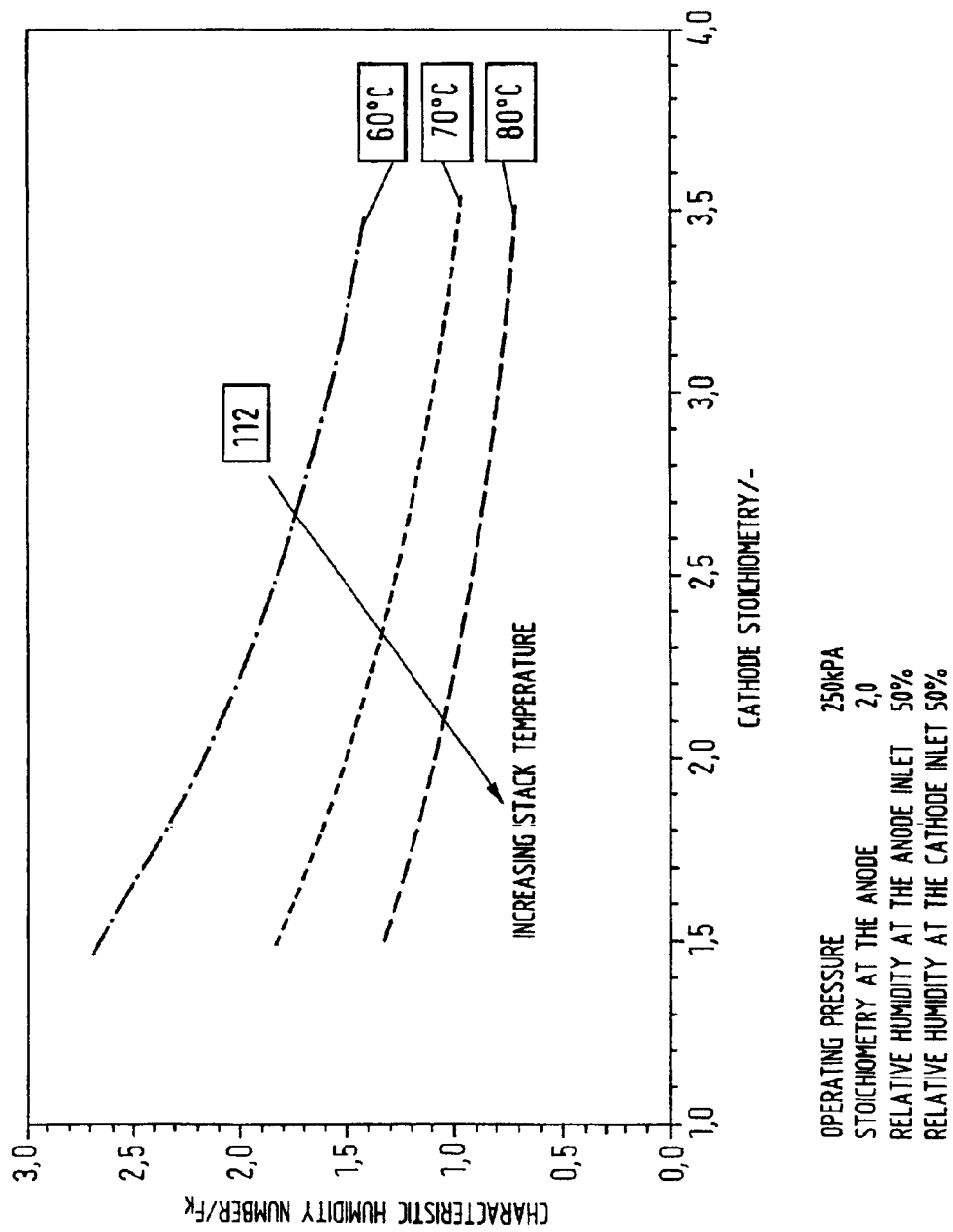
FIG. 4 is a graphical illustration of the humidity balance of a fuel cell in dependence on the operating parameters temperature and stoichiometry at the cathode.
Figure 5:
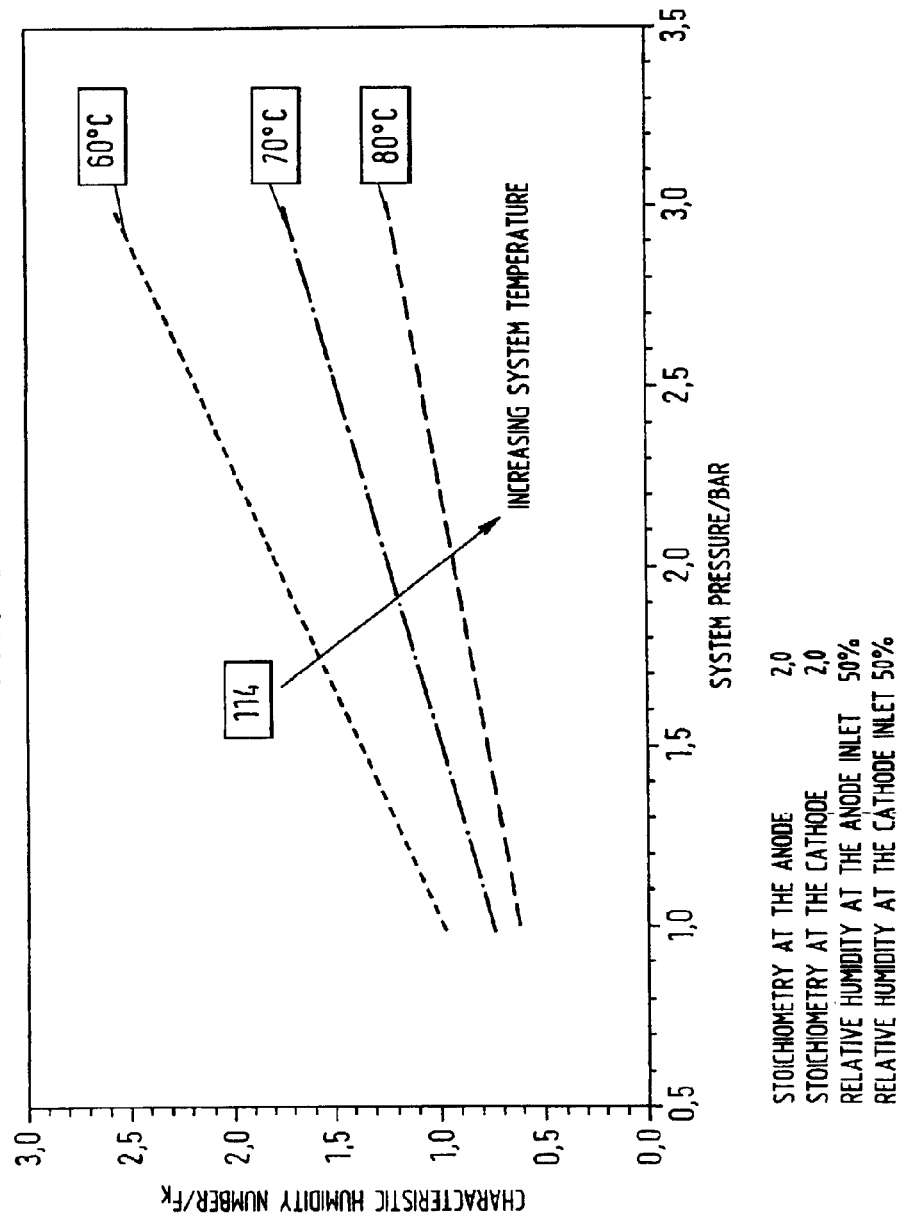
FIG. 5 is a graphical illustration of the humidity balance of a fuel cell in dependence on the operating parameters pressure and temperature.

The water balance around the entire stack is however determined by the operating parameters of pressure, temperature and gas stoichiometry in addition to the inlet humidities, as shown in FIGS. 3 to 5.

FIG. 3 shows for three different values of the operating pressure, i.e. the pressure at the inlet of the fuel cell stack 11 (also termed the system pressure), how the relative humidity at the outlet of the fuel cell stack varies with the stoichiometry of the cathode (C-air number) for a constant operating temperature of, in this example, 80° C., for a stoichiometry at the anode of 2.0, and for an assumed relative humidity of 50% at the anode side inlet of the fuel cell stack 11 and likewise of 50% at the cathode side inlet of the fuel cell stack 11.

The arrow 110 shows the direction in which the curves shift for higher operating pressures. One can thus see that with low stoichiometries at the cathode the characteristic humidity number $F_K$ at the outlet of the fuel cell stack arises and that these values are dependent on the respectively prevailing operating pressure. The three curves shown are representative of corresponding curves for each operating pressure and the precise shape of the curves changes depending on the operating temperature of the fuel cell stack, depending on the stoichiometry at the anode and depending on the inlet values of the relative humidity at the anode and cathode sides.

FIG. 4 shows how the relative humidity at the outlet of the fuel cell stack 11 vanes in dependence on the cathode stoichiometry at various operating temperatures of the fuel cell stack, here for the three different operating temperatures of 60, 70 and 80° C. The arrow 112 shows the direction in which the curves shift with increasing stack temperatures, i.e. operating temperatures. The curves shown here, which are given purely by way of example, for example, an operating pressure of 250 kPa, a stoichiometry at the anode of 2.0 and again relative humidity values of 50% at the anode and cathode inlets. Here also there is a whole family of curves which have to be found or specified for the respective fuel cell stack or type of fuel cell stack. One can see however that the relative humidity values increase at lower operating temperatures.

FIG. 5 shows in contrast the relative humidity at the outlet of the overall stack as a function of the operating pressure of the fuel cell stack and indeed in the form of three different curves which are representative of three different operating temperatures of the fuel cell stack 11 of 60, 70 and 80° C. These curves, which are given here purely by way of example, take account of a stoichiometry at the anode of 2.0, a stoichiometry at the cathode of 2.0 and a relative humidity of 50% at the anode and cathode side inlets of the fuel cell stack. Here also there is a whole family of corresponding curves which apply for other operating values and which have to be found or specified for the respective fuel cell stack, or for the respective type of fuel cell stack. The arrow 114 shows the direction in which the curves shift with increasing operating temperatures.

Figure 6:
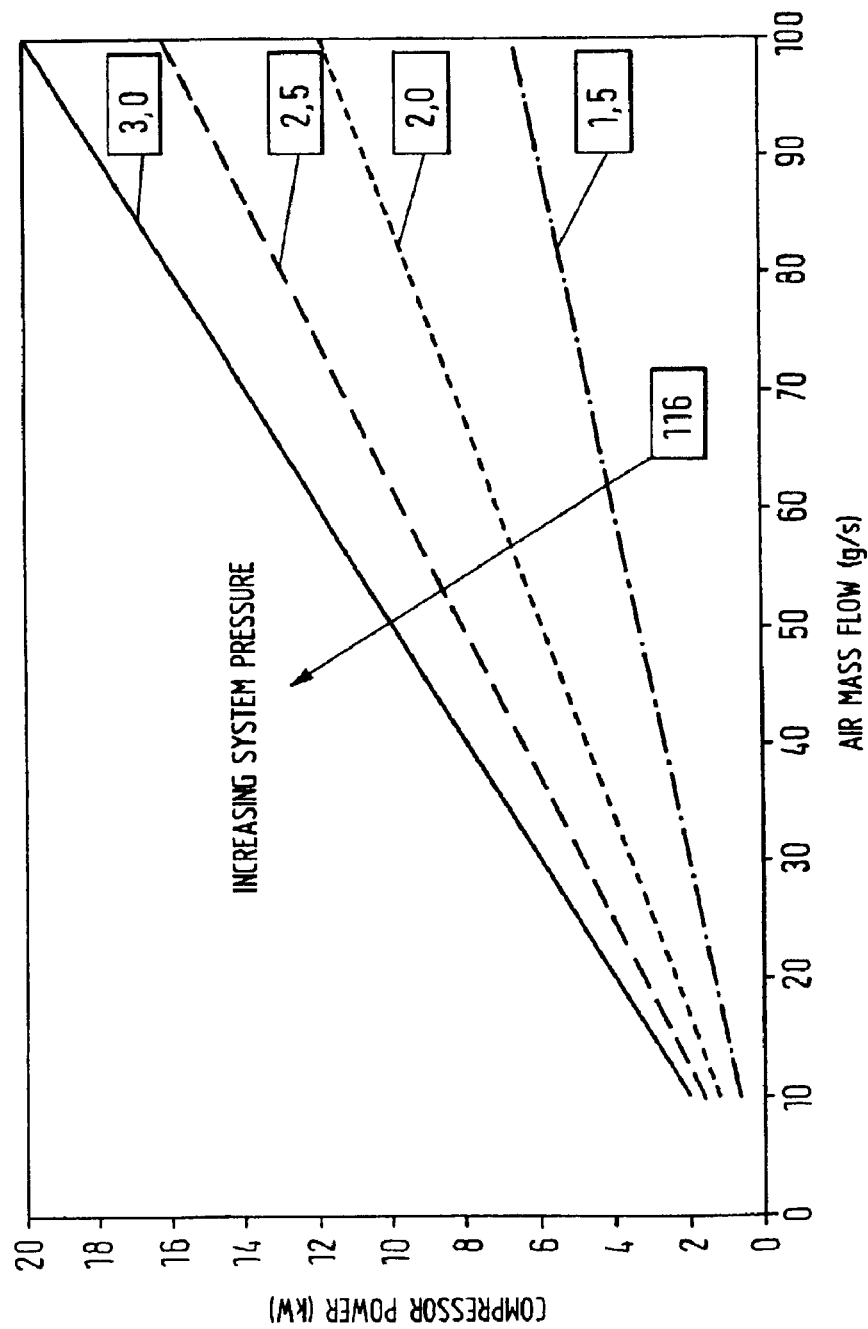
FIG. 6 is a graphical illustration of the compressor power of a compressor in dependence on the operating pressure and the air mass flow.

The operating pressure at which the stack is operated has, on the one hand, an influence on the water balance of this stack and on the other hand the gas pressure and the gas concentration of the reactants determine the partial pressures which have an influence on the efficiency of the fuel cell stack, as shown in FIG. 6 which will be explained later in more detail. Moreover, the operating pressure substantially influences the internal system consumption of electrical energy which has to be supplied to the compressor 67, with FIG. 6 showing the principle dependency.

FIG. 6 namely shows, purely by way of example, curves for the required compressor power in order to achieve specific air mass flow values in grams per second at four different operating pressures which are quoted in this example as 1.5 bar, 2.0 bar, 2.5 bar and 3.0 bar. The arrow 116 shows the direction in which the curves shift with increasing operating pressure. One can see that the compressor power which is required for a specific air mass flow increases significantly with increasing operating pressure. By way of example it is evident that for an air mass flow of 40 g/second at an operating pressure of 1.5 bar a compressor performance of approximately 2.5 kW is required whereas, the required compressor power has risen to about 9 kW at twice the operating pressure of 3.0 bar.

Figure 7:
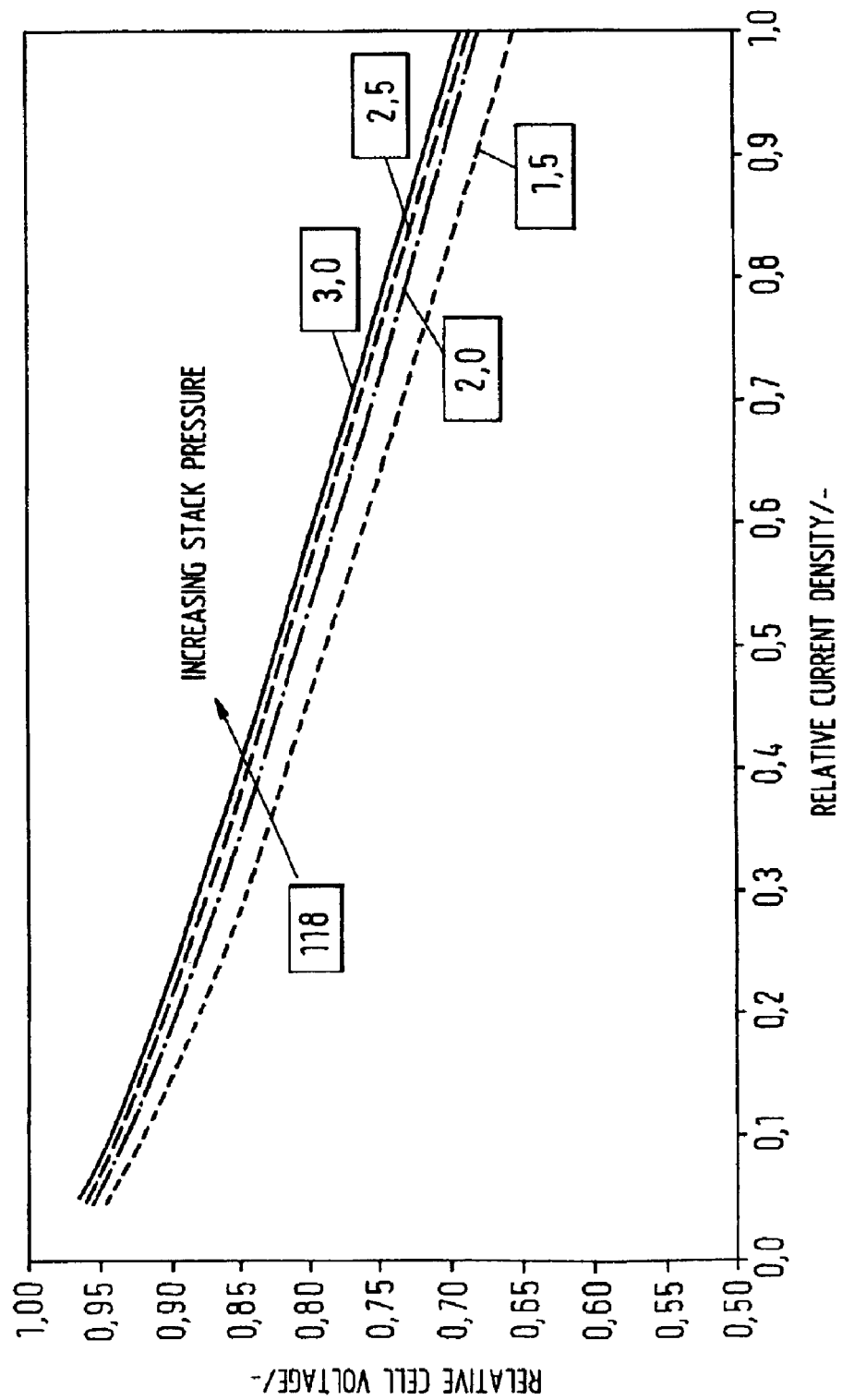
FIG. 7 is a graphical illustration of the relative fuel cell voltage with reference to various relative current densities at operating pressures.

It is evident from FIG. 7 that at the higher operating pressures of the fuel cell stack 11 higher cell output voltages can be achieved for a specific current density. The arrow 118 shows how the curves shift with increasing operating pressures. From a consideration of FIG. 7 one could tend to operate the stack at higher operating pressures, since one could hereby achieve a higher fuel cell power yield.

Figure 8:
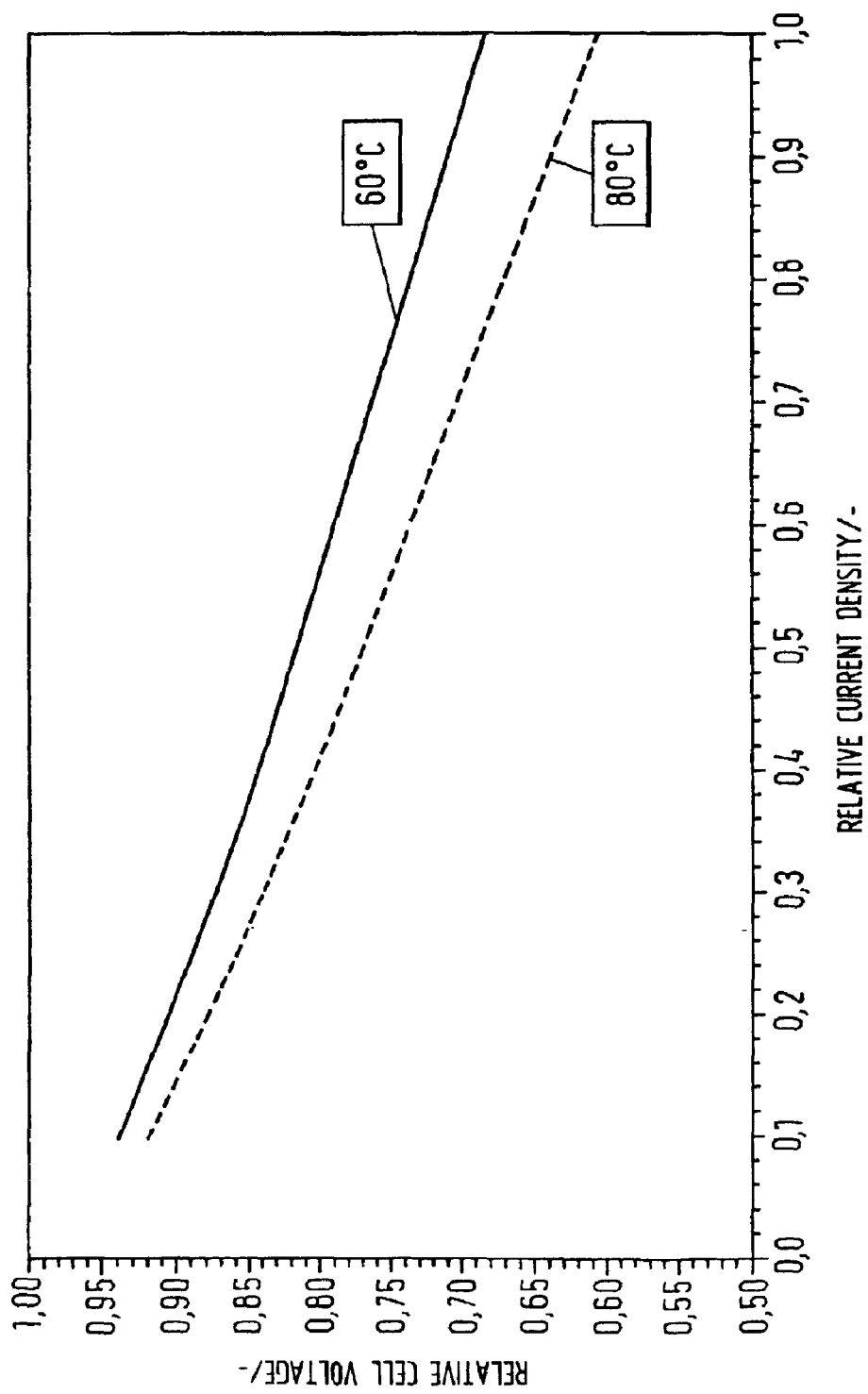
FIG. 8 is a graphical illustration of the relative fuel cell voltage which respect to various relative current densities.

FIG. 8 shows how the output voltage of an individual PEM fuel cell varies with current density and indeed for two different operating temperatures of 80° C. and 60° C. For a specific current density one can attain a higher cell voltage at a higher operating temperature.

The stack temperature has, in addition to an influence on the efficiency of the fuel cell, which is shown in FIG. 8, also an important influence on the thermal subsystem which is required for the cooling of the total stack, i.e. essentially for the dissipation of the heat produced in the stack. For the stack temperature and also for the gas pressure there existed hitherto specific desired values which were valid for the whole operating range of the fuel cell system. The regulation of the thermal subsystem must accordingly ensure the defined temperature of the stack, with restrictions being imposed by the design of the thermal subsystem.

The cooling system of a fuel cell vehicle is an important interface between the fuel cell system and the environment. Depending on the ambient conditions, of air temperature, air pressure and air humidity, corresponding cooling performances can be transferred via the cooling system of the vehicle to be environment. The most important influencing parameter in this respect is the ambient temperature and the air through flow (depending on vehicle speed and fan performance). Together with the temperature of the cooling medium to be cooled the ambient temperature has an effect on the characteristic parameter Q/ITD (Q=the quantity of heat; ITD=inlet temperature difference) which describes the capacity of the cooling system. The parameter Q/ITD is described by the quotient of the maximum cooling performance and the difference between the ambient temperature and the coolant temperature of the coolant medium entering into the cooling system.

$$\frac{Q}{ITD} = \frac{Q_{Cool}}{T_{Coolant\ in} - T_{ambient}}.$$

Figure 9:
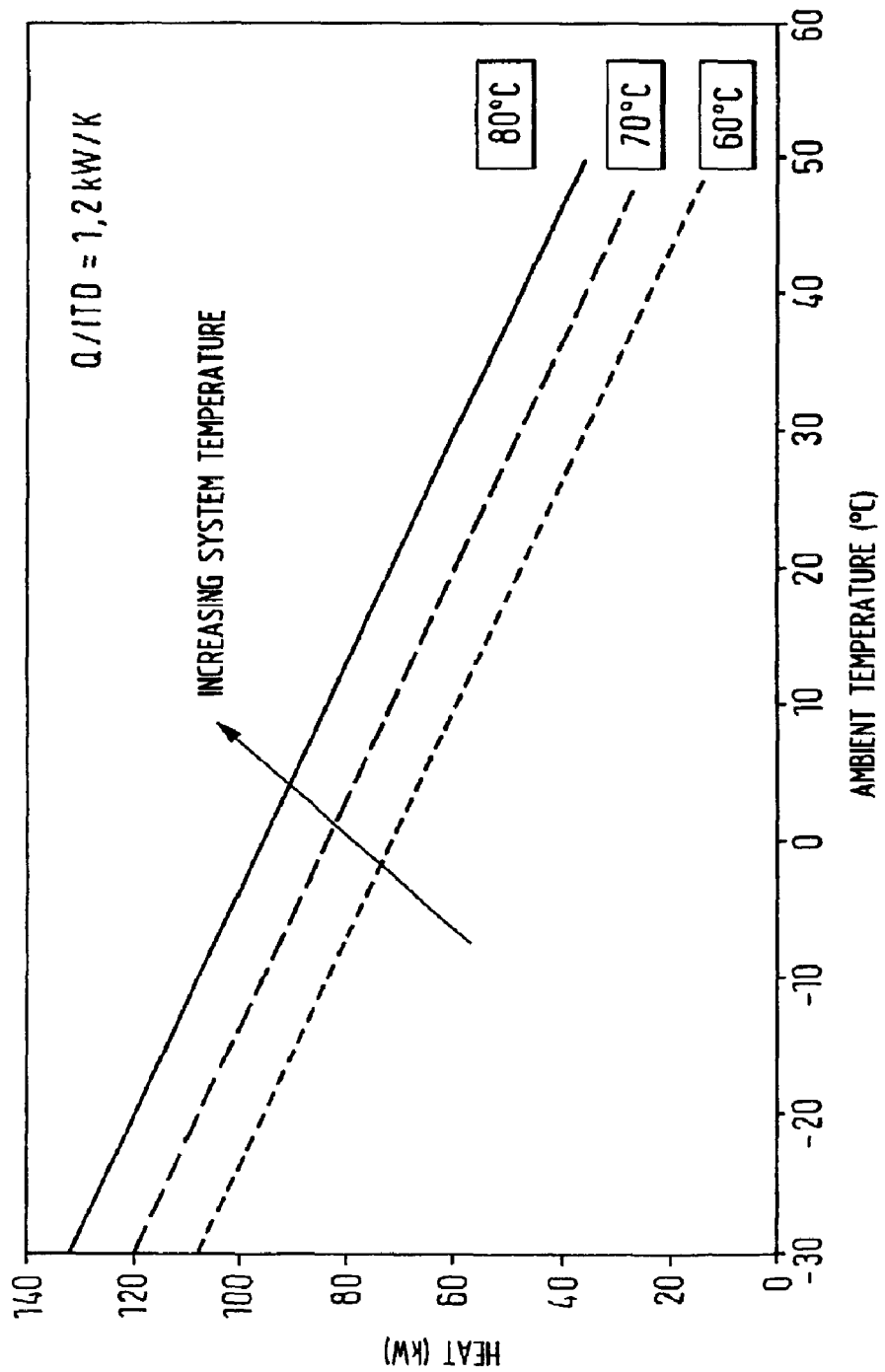
FIG. 9 is a graphical illustration of the vehicle cooling performance in dependence on the ambient temperature at various system temperatures.

The design of the cooling system for a vehicle is as a rule determined by the vehicle requirements. In particular the maximum climbing capability (low vehicle speed at maximum drive power) maximum towing load and maximum ambient temperature determine the required performance of a cooling system and thus the Q/ITD number. Furthermore, the assumption can be made that the temperature at which the coolant enters into the cooling system, which is measured in FIG. 1 by the temperature sensor 99 at the point the coolant leaves the fuel cell stack, corresponds to the system temperature of the fuel cell system. From this relationship it can be seen that with an increasing system temperature at the same ambient temperature, or with a reducing ambient temperature and constant system temperature, a larger quantity of heat can be transferred to the environment. FIG. 9 shows the dependence of the cooling performance in a vehicle as a function of the ambient temperatures.

The three curves shown in FIG. 9 show how, for a specific fuel cell stack or fuel cell stack type, the available cooling performance varies with the ambient temperature as a function of the system temperature of the fuel cell stack, which is determined by the temperature of the liquid coolant flowing into the fuel cell stack 11.

The dependency shown in FIG. 9 of the cooling system on the ambient temperature and on the system temperature makes the relationship between the fuel cell system and ambient conditions clear. A fuel cell system from which, by way of example, 60 kW of heat has to be dissipated at 100% system load requires, with an assumed Q/ITD value of 1.2 kW/K an at an ambient temperature of 30° C. a system temperature of 80° C. At an ambient temperature of 10° C. a system temperature of 60° C. is in contrast sufficient in order to dissipate the system heat of 60 kW to the environment.

Although the conversion efficiency of the fuel cells increases with higher partial pressures of the reactants, the operating pressure should be kept as low as possible, as described above, for an efficient overall system. Accordingly the operating pressure and thus the air pressure made available by the air compressor should be matched with respect to the prevailing system requirements and not, as in the prior art, be regulated to a specific design pressure which remains constant. The operating pressure thus becomes a regulating parameter the desired value of which is adapted depending on the prevailing operating parameters and operating conditions. Corresponding algorithms for the determination of the ideal system efficiency must be developed for the respective fuel cell system or for the respective type of fuel cell system and corresponding maps deposited in a data memory. An important operating parameter in this respect is the temperature of the fuel cell stack which, in addition to the operating pressure, essentially determines the gas inlet and outlet humidities for which in turn important requirements exist from the point of view of long term stability and electrical conductivity of the fuel cell membranes. Depending on the manner of operation and the operating state under transient power demands of the system, and also with different ambient temperatures and influences of system components, there are different demands on the operating pressure of a fuel cell system. With the object of achieving ideal system efficiencies by making available the lowest possible electrical compression work through reduction of the operating pressure (low system internal electrical loads) but nevertheless of supplying the respectively required operating pressure, the operating pressure for the fuel cell system must be variable and must be matched to the operating conditions.

The operating strategy which is described here involves thus the characteristic humidity number $F_K$ of the fuel cell stack as an identifiable operating parameter which must be maintained in order to ensure a damage-free operation of the fuel cells. The system is accordingly operated not as previously at a fixed preset pressure but rather is matched to the respectively prevailing conditions in order to maintain a desired $F_K$ value or range of $F_K$ values. The $F_K$ value is not measured, but rather the respective operating pressure is set for the respectively prevailing operating temperature under the given operating conditions, i.e. the required mass flows of air and $H_2$ in order to achieve the desired power yield of the fuel cell stack 11, the stoichiometries of the anode and of the cathode and also the relative humidity values at the cathode and at the anode inlet. The remaining operating parameters can be adapted to optimize the system operation and in dependence on system conditions.

At low ambient temperatures and for the same Q/ITD the operating temperature of the fuel cell system reduces for the same quantity of heat dissipated to the environment. This makes it possible to lower the operating pressure. In the part load range the operating temperature can be lowered even further for the same cooling performance. Under some circumstances one can decide to set the operating temperature to a reasonable value by changing the cooling performance or regulating the fan speed (eventually switching off of the fan) or by partly or fully bypassing the radiator in order to avoid an operation at an operating temperature which is unfavourable per se, for example, because it is too low.

The operating strategy described here exploits the available cooling performance in order to lower the operating temperature of the fuel cell stack, whereby the required operating pressure which the compressor must supply is reduced. This relationship is illustrated in the following FIG. 10.

With a required characteristic humidity number $F_K$ of the fuel cells of for example 120% at a temperature of 80° C. an operating pressure of 2.9 bar is required. A reduction of the fuel cell temperature to 60° C. reduces the operating pressure that is required to 1.3 bar which signifies a clearly lower electrical power requirement for the air compressor. In addition to the ambient temperature the air humidity of the ambient air and also the vehicle speed has an influence on the attainable cooling power. A comparison of these two operating states (80° C. stack temperature/290 kPa operating pressure and 60° C. stack temperature/130 kPa operating pressure) with respect to the fuel cell efficiency, the fuel cell net power (stack net power), the compressor performance and the system performance (system net power) is shown in FIG. 11.

Figure 11:
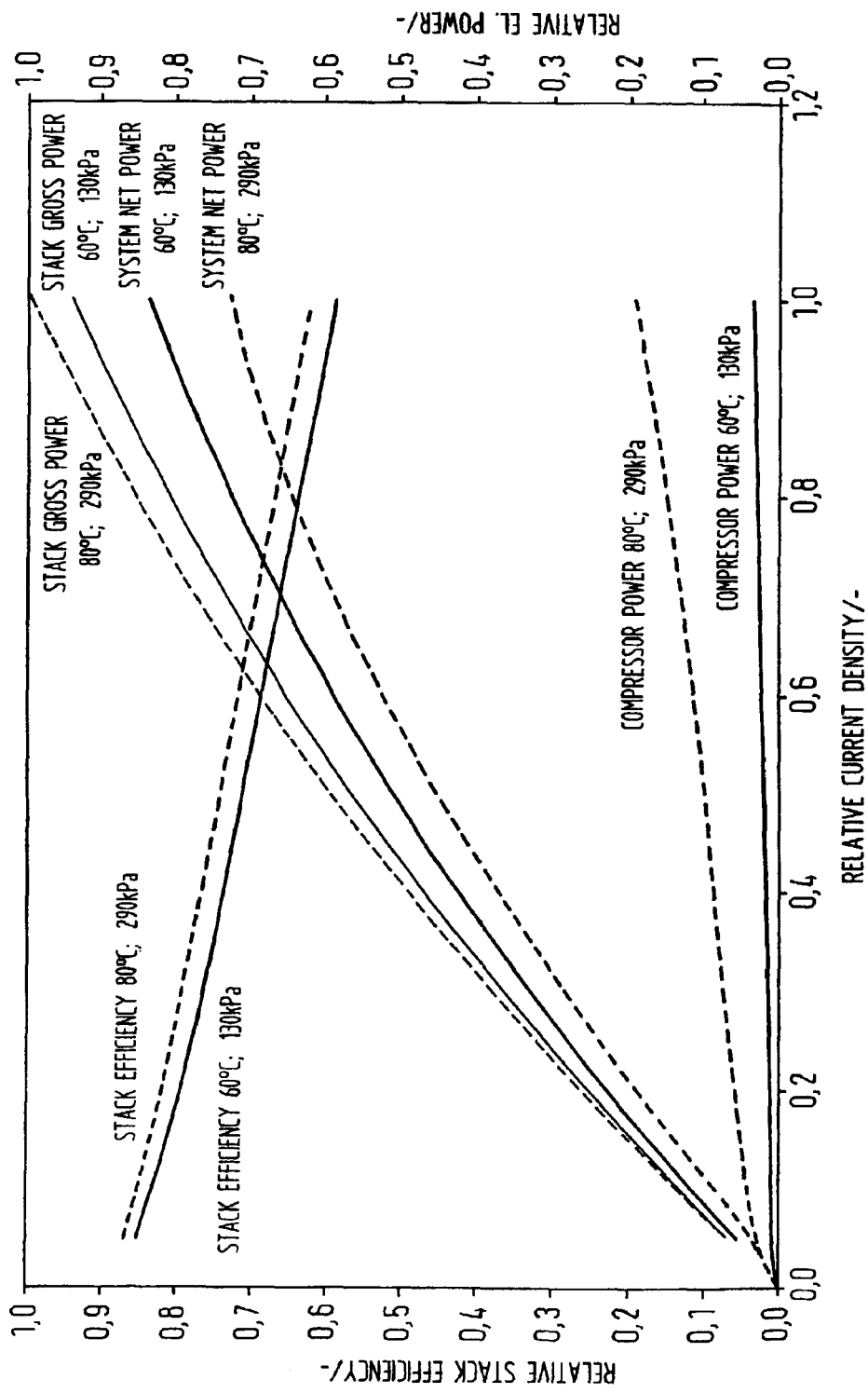
FIG. 11 is a graphical illustration of the system values with different operating parameters.
Figure 12:
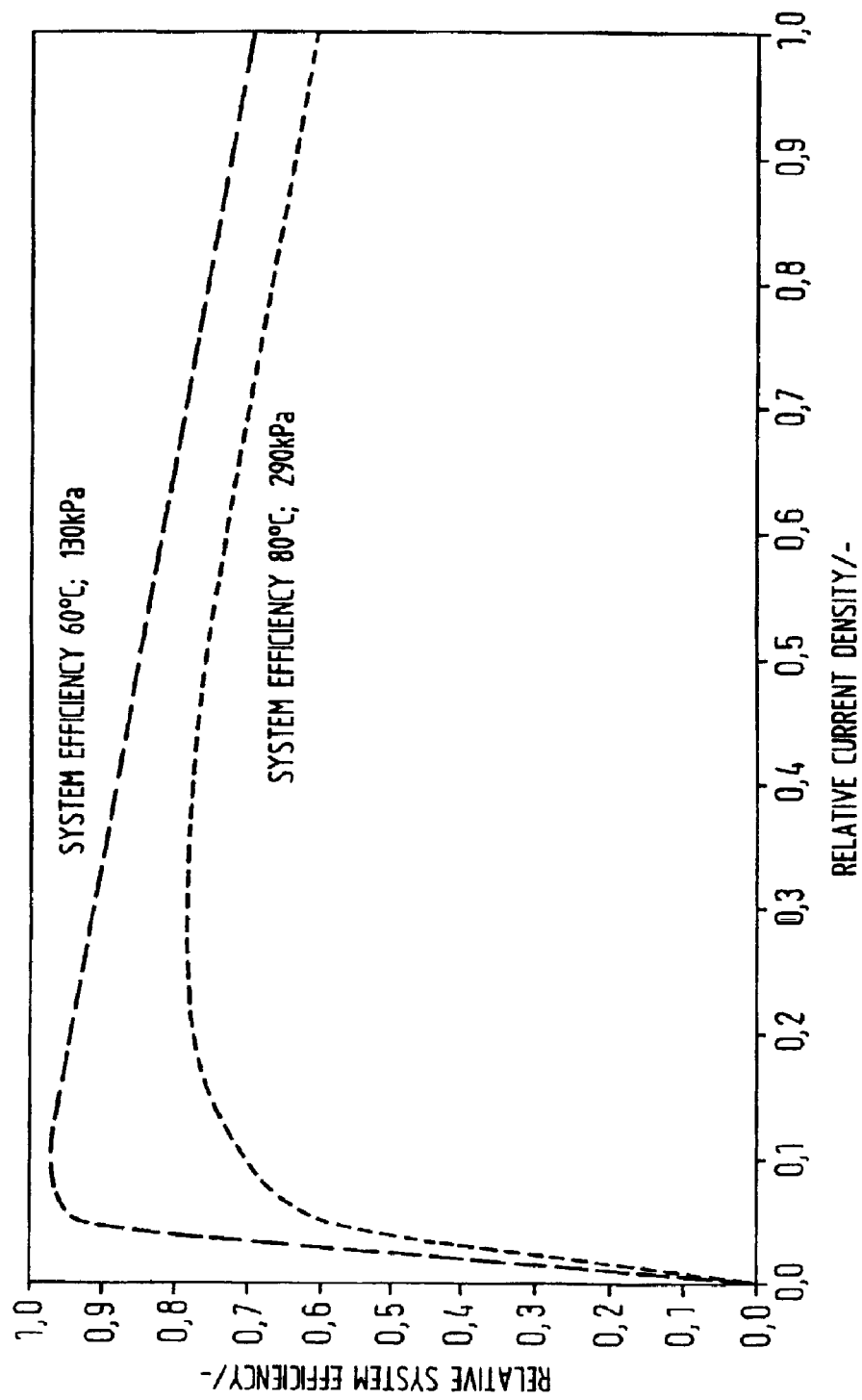
FIG. 12 is a graphical illustration of the system efficiency $P_{net}/P_{H2}$ for the high pressure/high temperature case and for the low pressure/low temperature case.

FIG. 11 clearly shows the comparison of the system values for the two operating states with which, in accordance with the relationship described in FIG. 10; identical humidities can be set in the fuel cell. Whereas, for the high pressure/high temperature case (80° C.; 290 kPa) significantly higher fuel cell efficiencies and thus higher fuel cell powers are achieved the net system power for the high pressure/high temperature case calculated as a result of the higher compressor performances lies below the values which are calculated with the system parameters for the low pressure/low temperature case (60° C.; 130 kPa). In FIG. 12 the system efficiency curves to be compared are illustrated and these show the same result.

The influences on the efficiency of the fuel cells, which is associated with a change of the operating parameters, must likewise be taken into account for the optimization of the overall system, such as the influences on the pressure losses via the individual system components.

A more efficient manner of operation of a fuel cell system is possible and also the flexibility of the fuel cell system is significantly increased having regard to the changing environmental conditions and load requirements. Further advantages are associated with a lower operating pressure and a lower operating temperature, such as an improved transient system behaviour, lower noise generation (comfort), reduced gas permeation through the fuel cell membranes, i.e. the quantities of $N_2$, $H_2$ and $O_2$ which pass through the membranes are smaller on the whole and this leads to a further improvement of the efficiency. The lower operating pressure and the lower operating temperature lead to a higher durability of the components.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

We claim:

1. A method for operation of a fuel cell system comprising:
    providing a fuel cell stack defining a plurality of operating points wherein each of said operating points are characterized by an operating temperature, an operating pressure, and a reactant stoichiometry within said fuel cell stack;
    providing a cooling system that establishes an actual operating temperature of said fuel cell stack independent of said reactant stoichiometry within said fuel cell stack;
    determining at least one actual operating temperature of said fuel cell stack; and
    providing a compressed flow of an oxygen containing gas to a cathode inlet at an operating pressure controlled such that it represents a minimum pressure necessary to ensure operation of said fuel cell system at an actual operating point defined by said actual operating temperature.

2. A method as claimed in claim 1, wherein said fuel stack comprises an anode and said stoichiometry is taken at said anode.

3. A method as claimed in claim 1, wherein said fuel stack comprises a cathode and said stoichiometry is taken at said cathode.

4. A method as claimed in claim 1, wherein said actual operating point is additionally defined by a stoichiometry within said fuel cell stack.

5. A method as claimed in claim 4, wherein said fuel stack comprises an anode and said stoichiometry of said actual operating point is taken at said anode.

6. A method as claimed in claim 4, wherein said fuel stack comprises a cathode and said stoichiometry of said actual operating point is taken at said cathode.

7. A method as claimed in claim 1, wherein said at least one actual operating temperature is determined from at least one of an actual operating temperature, a value corresponding to an actual operating temperature, and a value proportional to an actual operating temperature.

8. A method as claimed in claim 1, wherein said fuel cell stack comprises a plurality of fuel cells that generate electrical energy, an anode inlet for a fuel, a cathode inlet for an oxygen containing gas, and a cathode outlet.

9. A method as claimed in claim 8, wherein the operating pressure is effected by controlling a restrictor valve connected to said cathode outlet.

10. A method as claimed in claim 1, wherein said cooling system includes a cooling fluid that carries away heat generated in said fuel cell stack.

11. A method as claimed in claim 1, wherein said compressed flow of an oxygen containing gas is provided by a compressor, and a compressor component.

12. A method as claimed in claim 11, wherein said compressor comprises at least one component having a variable geometry and wherein said method further comprises the step of optimizing the efficiency of said compressor by controlling said variable geometry component.

13. A method as claimed in claim 12, wherein said control of said at least one component having a variable geometry component takes into account an operating pressure and mass flow value of said oxygen containing gas provided by said compressor.

14. A method as claimed in claim 12, wherein said optimizing step comprises adjustment of adjustable guide vanes associated with said compressor.

15. A method as claimed in claim 12, wherein said optimizing step comprises adjustment of adjustable guide nozzles associated with said compressor.

16. A method as claimed in claim 1, wherein said operating points are further characterized by a humidity of a gas within said fuel cell stack.

17. A method as claimed in claim 1, wherein said actual operating point is additionally defined by a humidity of a gas within said fuel cell stack.

18. A method as claimed in claim 1, wherein said operating pressure is further controlled so as to take account of a desired characteristic humidity number ($F_K$) at said cathode outlet.

19. A method as claimed in claim 18, wherein said characteristic humidity number ($F_K$) is kept in a predetermined range to ensure damage-free operation of said fuel cell system.

20. A method as claimed in claim 1, wherein said operating pressure is further controlled so as to take account of a relative humidity value of said oxygen containing gas entering into said cathode inlet.

21. A method as claimed in claim 1, wherein said operating pressure is further controlled so as to take account of a relative humidity value of gaseous fuel entering said anode inlet in the selection of a respective operating pressure value.

22. A method as claimed in claim 1, further comprising matching a mass flow value of said fuel supplied to said fuel cell stack to a respective power requirement.

23. A method as claimed in claim 1, further comprising matching a mass flow of said oxygen containing gas supplied to said fuel cell stack to a respective power requirement.

24. A method as claimed in claim 1, wherein said fuel cell stack comprises an anode and a cathode and said method comprises taking account of a value for stoichiometry at the anode in the selection of said operating pressure.

25. A method as claimed in claim 1, wherein said fuel cell stack comprises an anode and a cathode and said method comprises taking account of a value for stoichiometry at the cathode in the selection of said operating pressure.

26. A method as claimed in claim 1, wherein said cooling system is operated to lower said actual operating temperature to a lowest possible value that is acceptable for efficient operation of said fuel cell system.

27. A method as claimed in claim 1, wherein said cooling system is operated to keep a respective operating pressure value as small as permissible to operate with said actual operating temperature.

28. A method as claimed in claim 1, wherein said cooling system comprises a fan having a fan speed and a pump having a pump speed and wherein cooling performance is reduced by reducing said fan speed, said pump speed, or combinations thereof.

29. A method as claimed in claim 1, wherein said cooling system comprises a pump having a pump speed and wherein noise is minimized by reducing said pump speed.

30. A method as claimed in claim 1, wherein said cooling system comprises a fan having a fan speed and a pump having a pump speed and wherein said fan speed and said pump speed are reduced when a vehicle powered by said fuel cell system is operating at in an idling condition.

31. A method as claimed in claim 1, wherein said cooling system comprises a fan having a fan speed and a pump having a pump speed and wherein said fan speed and said pump speed are reduced when a vehicle powered by said fuel cell system is operating at a low vehicle speed.

32. A method as claimed in claim 1, wherein said operating pressure is controlled by taking account of a prevailing ambient temperature and its effect on the cooling system and on said actual operating temperature.

33. A method as claimed in claim 1, wherein said operating pressure is used as a regulating parameter having a desired value which is matched to prevailing operating parameters and conditions of said fuel cell system.

34. A method as claimed in claim 33, wherein said desired value is determined by an algorithm which takes account of said prevailing operating parameters and operating conditions.

35. A method as claimed in claim 33, wherein said desired value is determined from stored characteristic parameters.

36. A fuel cell system comprising:

a fuel cell stack defining a plurality of operating points wherein each of said operating points are characterized by an operating temperature, an operating pressure, and a reactant stoichiometry within said fuel cell stack;

a cooling system adapted to establish an actual operating temperature of said fuel cell stack independent of said reactant stoichiometry within said fuel cell stack;

a temperature sensor adapted to determine said actual operating temperature established by said independent cooling system; and pressure components configured to produce a compressed flow of oxygen containing gas for delivery to a cathode inlet of said fuel cell stack at an operating pressure, that represents a minimum pressure necessary to ensure operation of said fuel cell system at an actual operating point defined by said actual operating temperature.

37. A fuel cell system as claimed in claim 36, wherein said fuel cell system further comprises a control system configured to control at least one of said pressure components in accordance with one of said actual operating temperature.

38. A fuel cell system as claimed in claim 37, wherein said control system is configured to set said operating pressure to a minimum pressure necessary to ensure operation of said fuel cell system at said actual operating point defined by said actual operating temperature.

39. A fuel cell system as claimed in claim 37, wherein said temperature sensor is connected to said control system.

40. A fuel cell system as claimed in claim 36, wherein said fuel cell stack comprises a plurality of fuel cells, an anode inlet for a fuel, a cathode inlet for an oxygen containing gas, and a cathode outlet.

41. A fuel cell system as claimed in claim 40, wherein said fuel comprises one of hydrogen and a hydrogen rich synthesized gas.

42. A fuel cell system as claimed in claim 36, wherein said cooling system directs a cooling fluid through said fuel cell stack to carry away heat produced in said fuel cell stack.

43. A fuel cell system, as claimed in claim 36, wherein said temperature sensor determines said actual operating temperature from at least one of an actual operating temperature, a value corresponding to an actual operating temperature, and a value proportional to an actual operating temperature.

44. A fuel cell system as claimed in claim 36, wherein said pressure components comprise a compressor, an electric motor, and a compressor component.

45. A fuel cell system as claimed in claim 44, wherein said oxygen containing gas comprises air and said compressor is an air compressor.

46. A fuel cell system as claimed in claim 44, wherein said compressor component comprises a restrictor valve.

47. A fuel cell system as claimed in claim 46, wherein said restrictor valve is connected to said fuel cell system after a cathode outlet of said fuel cell stack.

48. A fuel cell system as claimed in claim 44, wherein said compressor comprises at least one compressor component of variable geometry and said control system is adapted to change said geometry of said at least one component.

49. A fuel cell system as claimed in claim 44, wherein said compressor is configured to enable the most efficient possible operation of said compressor at each operating point.

50. A fuel cell system as claimed in claim 49, wherein said at least one component of variable geometry comprises adjustable guide vanes.

51. A fuel cell system as claimed in claim 49, wherein said at least one component of variable geometry comprises adjustable guide nozzles.

52. A fuel cell system as claimed in claim 36, further comprising first and second sensors for measuring a relative humidity value of a gas within said fuel cell stack.

53. A fuel cell system as claimed in claim 52, wherein said fuel cell stack comprises an anode inlet and a humidity sensor configured to measure said relative humidity value at said anode inlet.

54. A fuel cell system as claimed in claim 52, wherein said fuel cell stack comprises a cathode inlet and a humidity sensor configured to measure said relative humidity value at said cathode inlet.

55. A fuel cell system as claimed in claim 36, further comprising a memory associated with said control system that stores values for respectively appropriate operating pressures and an algorithm for the calculation of respectively appropriate operating pressures for various actual operating temperatures and various operating parameters of said fuel cell stack.

56. A fuel cell system as claimed in claim 36, wherein said fuel cell stack comprises an anode and a cathode and said control system is configured to account for stoichiometry values at said anode and at said cathode for various operating points of said fuel cell stack.

57. A fuel cell system as claimed in claim 56, wherein said stoichiometry values are stored in a memory.

58. A fuel cell system as claimed in claim 36, wherein said control system comprises an input for a power requirement signal.

59. A fuel cell system as claimed in claim 36, wherein said control system is configured such that a valve for determining a mass flow of fuel supplied to said fuel cell stack is controllable by said control system in accordance with a respective power requirement.

* * * * *